United States Patent
Jung et al.

(10) Patent No.: US 12,429,996 B2
(45) Date of Patent: Sep. 30, 2025

(54) METHOD FOR CONTROLLING ELECTRONIC DEVICE BY USING STYLUS, AND ELECTRONIC DEVICE FOR RECEIVING INPUT FROM STYLUS BY USING METHOD

(71) Applicant: SAMSUNG ELECTRONICS CO., LTD., Suwon-si (KR)

(72) Inventors: Inhyung Jung, Suwon-si (KR); Banghyun Kwon, Suwon-si (KR); Hyunwoong Kwon, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/198,609

(22) Filed: May 17, 2023

(65) Prior Publication Data
US 2023/0289025 A1    Sep. 14, 2023

Related U.S. Application Data

(63) Continuation of application No. PCT/KR2021/017731, filed on Nov. 29, 2021.

(30) Foreign Application Priority Data

Nov. 27, 2020  (KR) .................. 10-2020-0161896

(51) Int. Cl.
*G06F 1/16* (2006.01)
*G06F 3/0346* (2013.01)
(Continued)

(52) U.S. Cl.
CPC ........ *G06F 3/04812* (2013.01); *G06F 3/0346* (2013.01); *G06F 3/03545* (2013.01);
(Continued)

(58) Field of Classification Search
CPC .............. G06F 3/04812; G06F 3/0346; G06F 3/03545; G06F 3/0383; G06F 3/0482; G06F 2203/1614; G06F 2203/0384
See application file for complete search history.

(56) References Cited

U.S. PATENT DOCUMENTS 6,686,909 B1    2/2004  Endo
8,823,749 B2    9/2014  Horodezky et al.
(Continued)

FOREIGN PATENT DOCUMENTS

JP    2001-147778 A    5/2001
KR    10-2005-0115148 A    12/2005
(Continued)

OTHER PUBLICATIONS

International Search Report (PCT/ISA/210) issued by the International Searching Authority on Mar. 10, 2022 in International Application No. PCT/KR2021/017731.
(Continued)

*Primary Examiner* — Sanghyuk Park
(74) *Attorney, Agent, or Firm* — Sughrue Mion, PLLC

(57) ABSTRACT

A method of controlling an electronic device using a stylus includes establishing a wireless communication connection between the electronic device and the stylus; displaying a pointing object on a screen displayed on a display of the electronic device, wherein a position of the pointing object on the screen corresponds to a position of the stylus; obtaining first information related to whether an orientation of the electronic device is changed and second information related to whether the screen is fixed; setting a direction of a coordinate system of the display based on the first information and the second information; and moving the pointing object on the screen within the coordinate system to correspond to a movement of the stylus in space.

7 Claims, 14 Drawing Sheets

(51) Int. Cl.
*G06F 3/0354* (2013.01)
*G06F 3/038* (2013.01)
*G06F 3/04812* (2022.01)
*G06F 3/0482* (2013.01)

(52) U.S. Cl.
CPC .......... *G06F 3/0383* (2013.01); *G06F 3/0482* (2013.01); *G06F 2203/0384* (2013.01)

(56) References Cited

U.S. PATENT DOCUMENTS

| | | | |
|---|---|---|---|
| 9,223,493 | B2 | 12/2015 | Cho |
| 9,720,521 | B2 | 8/2017 | Altman et al. |
| 9,965,058 | B2 | 5/2018 | Cho |
| 10,082,876 | B2 | 9/2018 | Chi et al. |
| 10,761,611 | B2 | 9/2020 | Giusti et al. |
| 11,353,968 | B2 | 6/2022 | Jang et al. |
| 2005/0270277 | A1 | 12/2005 | Park |
| 2010/0315438 | A1 | 12/2010 | Horodezky et al. |
| 2011/0134030 | A1* | 6/2011 | Cho ................. G06F 3/048 345/157 |
| 2011/0280543 | A1* | 11/2011 | Uchida ............. H04N 21/4122 386/E5.028 |
| 2012/0262372 | A1* | 10/2012 | Kim .................. G06F 1/1694 345/158 |
| 2013/0113731 | A1 | 5/2013 | Yoo et al. |
| 2014/0055427 | A1 | 2/2014 | Kim et al. |
| 2014/0210797 | A1 | 7/2014 | Kreek et al. |
| 2014/0253464 | A1* | 9/2014 | Hicks ................ G06F 3/0488 345/173 |
| 2015/0242002 | A1 | 8/2015 | Altman et al. |
| 2016/0299606 | A1 | 10/2016 | Go |
| 2017/0038845 | A1 | 2/2017 | Chi et al. |
| 2017/0046123 | A1 | 2/2017 | Song et al. |
| 2019/0064937 | A1* | 2/2019 | Ananda ............. G06F 3/0346 |
| 2020/0125528 | A1* | 4/2020 | Hutton ............. G06F 15/0291 |
| 2020/0150771 | A1 | 5/2020 | Giusti et al. |
| 2021/0072846 | A1 | 3/2021 | Jang et al. |

FOREIGN PATENT DOCUMENTS

| | | |
|---|---|---|
| KR | 10-2011-0062296 A | 6/2011 |
| KR | 10-2013-0017339 A | 2/2013 |
| KR | 10-2013-0032596 A | 4/2013 |
| KR | 10-2014-0026711 A | 3/2014 |
| KR | 10-2015-0080480 A | 7/2015 |
| KR | 10-2016-0080036 A | 7/2016 |
| KR | 10-2016-0089717 A | 7/2016 |
| KR | 10-2017-0017112 A | 2/2017 |
| KR | 10-2017-0019649 A | 2/2017 |
| KR | 10-1862706 B1 | 5/2018 |
| KR | 10-2019-0069877 A | 6/2019 |
| KR | 10-2020-0062275 A | 6/2020 |

OTHER PUBLICATIONS

Written Opinion (PCT/ISA/237) issued by the International Searching Authority on Mar. 10, 2022 in International Application No. PCT/KR2021/017731.

Communication issued Dec. 19, 2024 by the Korean Intellectual Property Office in Korean Patent Application No. 10-2020-0161896.

* cited by examiner

1210

| Actions | | Camera | Media |
|---|---|---|---|
| Button Press | Single Press | Capture | Play / Pause |
| | Double Press | Change Front / Rear Camera | Next |
| Gesture | Left / Right | Change camera modes | Play media in Previous / Next |
| | Up / Down | Switch Front / Rear Camera | Change volume Up / Down |
| | Rotation | Camera zoom in / out or angle transition. Angle transition for Camera modes that do not support zooming (Selfie, Live Focus, Panorama) | - |

1220

| Camera | Mode | Clockwise | Counterclockwise |
|---|---|---|---|
| Front Camera | Photo | Change an angle of view | Change an angle of view |
| | Live Focus | Change an angle of view | Change an angle of view |
| Rear Camera | Photo | Zoom in | Zoom out |
| | Video | Zoom in | Zoom out |
| | Pro | Zoom in | Zoom out |
| | Night | Zoom in | Zoom out |
| | Food | Zoom in | Zoom out |
| | Live Focus | Change an angle of view | Change an angle of view |
| | Panorama | Change an angle of view | Change an angle of view |

1230

| App | Up / Down | Left / Right | Clockwise / Counterclockwise |
|---|---|---|---|
| Spotify | Volume up / down | Previous / Next Track | Volume up / down |
| YouTube | Volume up / down | Previous / Next Video | Volume up / down |
| Netflix | Volume up / down | Previous / Next Video | Volume up / down |

FIG. 12

METHOD FOR CONTROLLING ELECTRONIC DEVICE BY USING STYLUS, AND ELECTRONIC DEVICE FOR RECEIVING INPUT FROM STYLUS BY USING METHOD

CROSS-REFERENCE TO RELATED APPLICATIONS

This application is a by-pass continuation of International Application No. PCT/KR2021/017731, filed on Nov. 29, 2021, which is based on and claims priority to Korean Patent Application No. 10-2020-0161896, filed on Nov. 27, 2020, in the Korean Intellectual Property Office, the disclosures of which are incorporated by reference herein in their entireties.

BACKGROUND

1. Field

The disclosure relates to a method for controlling an electronic device using a stylus and an electronic device that receives an input from a stylus by using the method.

2. Description of Related Art

An electronic device may receive an input from a stylus, which may be one of several input devices. The stylus may be connected to the electronic device through wireless communication. The stylus may provide various inputs to an electronic device. For example, the stylus may provide a touch input by making contact on a display of an electronic device. As another example, a button input may be provided by pressing a button of a stylus connected to an electronic device through wireless communication. An electronic device may perform various functions in response to a touch input and/or a button input of a stylus. For example, the electronic device may enlarge, reduce, and/or move a screen displayed on a display or draw new content on the screen in response to a touch input of a stylus. As another example, the electronic device may take a picture in response to a button input while a camera application is executed.

A stylus may also support an air action function. When a stylus supporting an air action function is moved in space while connected to an electronic device through wireless communication, an input may be provided to the electronic device. For example, a screen of an electronic device may be moved or converted by moving a stylus supporting an air action function in space. As another example, a pointing object may be displayed at a location indicated by a tip of a stylus supporting an air action function on the screen of a display of an electronic device. A pointing object may be a pointer.

When an electronic device is rotated to change the orientation of the electronic device, the coordinate system of the display in which a pointing object moves may change. However, when the direction of the screen displayed by the electronic device is fixed to a specified direction, it may not be easy to change the coordinate system.

When the direction of the screen displayed by an electronic device is fixed to a specified direction, the coordinate system may not change even when the electronic device is rotated to change the orientation of the electronic device. When the coordinate system does not change even when the orientation of the electronic device changes due to rotation of the electronic device, a pointing object may move differently from the movement of a stylus in space. For example, even though the electronic device is rotated by 90 degrees and the direction in which the electronic device is placed changes from a vertical direction to a horizontal direction, the coordinate system does not change, so that the pointing object may move laterally when the stylus is moved upward in space.

SUMMARY

Provided are a method that moves a pointing object displayed on a screen of a display of an electronic device to correspond to a movement of a stylus supporting an air action function in a space, and an electronic device that receives an input from the stylus by using the method.

According to an aspect of the disclosure, a method of controlling an electronic device using a stylus, includes: establishing a wireless communication connection between the electronic device and the stylus; displaying a pointing object on a screen displayed on a display of the electronic device, wherein a position of the pointing object on the screen corresponds to a position of the stylus; obtaining first information related to whether an orientation of the electronic device is changed and second information related to whether the screen is fixed; setting a direction of a coordinate system of the display based on the first information and the second information; and moving the pointing object on the screen within the coordinate system to correspond to a movement of the stylus in space.

The first information may include information on whether the electronic device is in a portrait mode or a landscape mode.

The first information may include state information set in a setting menu, and the state information may include an automatic rotation state and a vertical fixation state.

The second information may indicate that a direction of the screen is fixed, based on inactivation of an automatic rotation function of the screen in a setting menu of the electronic device.

The second information may indicate that the screen is fixed, based on an execution screen of an application in which the screen is fixed in a specific direction being displayed on the display.

The first information may indicate that the direction of the coordinate system is changed when the orientation of the electronic device is changed, and the second information may indicate that the screen is fixed in the second information.

The moving the pointing object further may include: receiving coordinate information and an inclination value of the stylus; and mapping the pointing object onto a location on the screen corresponding to the coordinate information and the inclination value.

The method may further include: connecting the electronic device to an external electronic device; obtaining, by the electronic device, external display information from the external electronic device; and adjusting a moving speed and a moving distance of an external pointing object displayed on a screen displayed by the external electronic device based on the external display information.

The external display information may include a resolution, a refresh rate, a size, and a vertical-to-horizontal ratio of a display of the external electronic device.

The size of the display of the external electronic device and the vertical-to-horizontal ratio of the display of the external electronic device are included in model information of the external electronic device, and when the electronic device and the external electronic device are connected to each other in a specified connection scheme, the electronic device receives the model information of the external electronic device from the external electronic device.

According to an aspect of the disclosure, an electronic device includes: a communication circuit; a display configured to display a screen; a stylus; and at least one processor operatively connected to the communication circuit, the display and the stylus, wherein the at least one processor is configured to: establish a wireless communication connection between the electronic device and the stylus through the communication circuit, display a pointing object on the screen, wherein a position of the pointing object on the screen corresponds to a position of the stylus, obtain first information related to whether an orientation of the electronic device is changed and second information related to whether the screen is fixed, set a direction of a coordinate system of the display based on the first information and the second information, and move the pointing object on the screen within the coordinate system to correspond to a movement of the stylus in space.

The first information may include information on whether the electronic device is in a portrait mode or a landscape mode.

The first information may include state information set in a setting menu, and the state information may include an automatic rotation state and a vertical fixation state.

The second information may indicate that the screen is fixed, based on inactivation of an automatic rotation function of the screen in a setting menu of the electronic device.

The second information may indicate that the screen is fixed, based on an execution screen of an application in which the screen is fixed in a specific direction being displayed on the display.

According to one or more embodiments of the disclosure, as a user moves the stylus in space, a pointing object may move, so that it is possible to easily move the pointing object on a screen as the user intends.

In addition, according to one or more embodiments of the disclosure, it is possible to control the moving speed and/or shape of the pointing object to correspond to the size, ratio, and/or shape of a display displaying a pointing object.

In addition, various effects that are directly or indirectly understood through the present disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a diagram illustrating an air action function by which an electronic device performs a specified operation according to manipulation of a stylus according to an embodiment.

With regard to description of drawings, the same or similar elements may be marked by the same or similar reference numerals.

DETAILED DESCRIPTION

Figure 1:
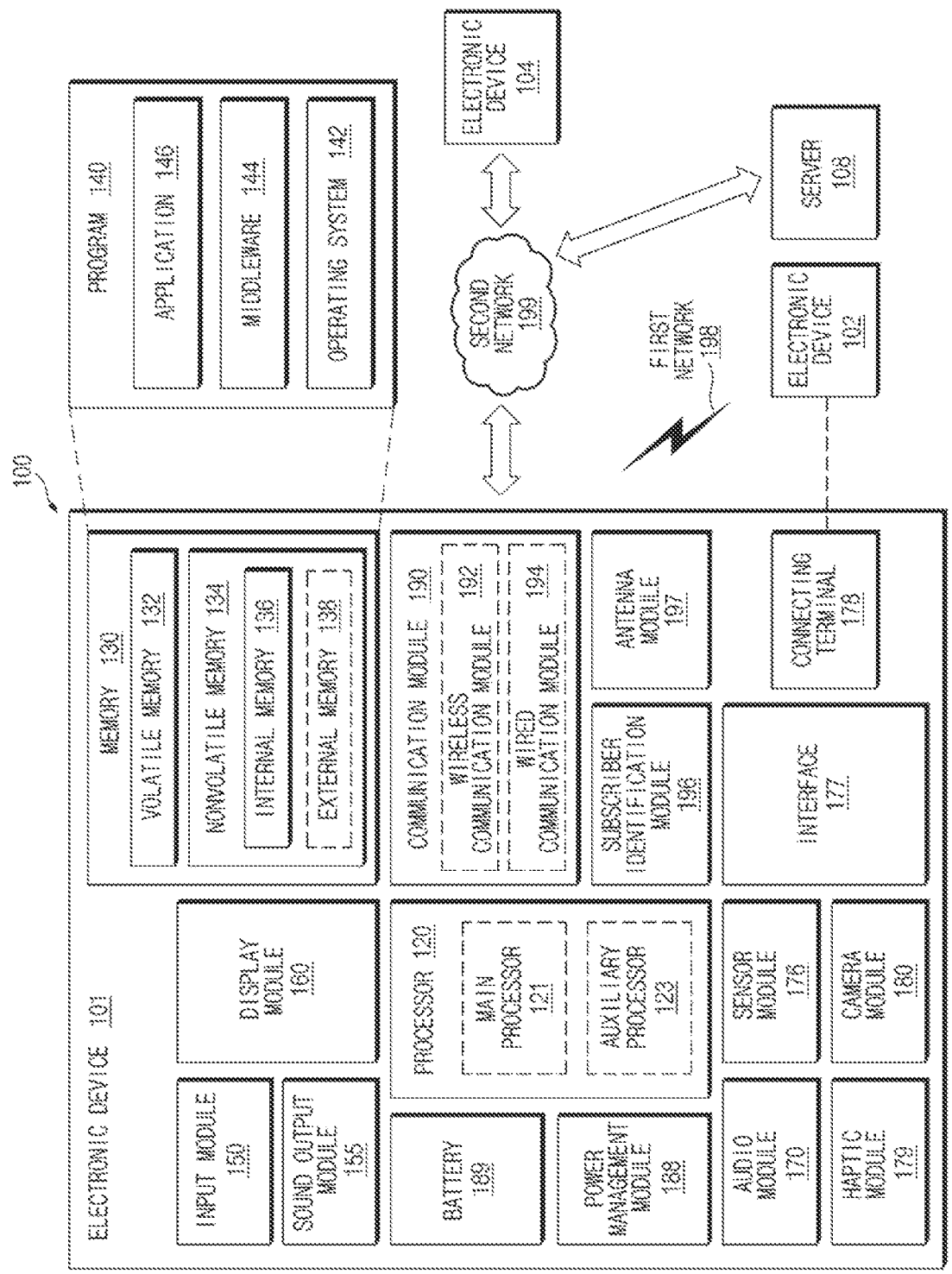
FIG. 1 is a block diagram illustrating an electronic device in a network environment according to various embodiments.

Hereinafter, various embodiments of the disclosure are described with reference to the accompanying drawings. However, this is not intended to limit the disclosure to specific embodiments. It should be understood that the disclosure includes various modifications, equivalents, and/or alternatives of embodiments of the disclosure. In connection with the description of the drawings, like reference numerals may be used for like elements.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
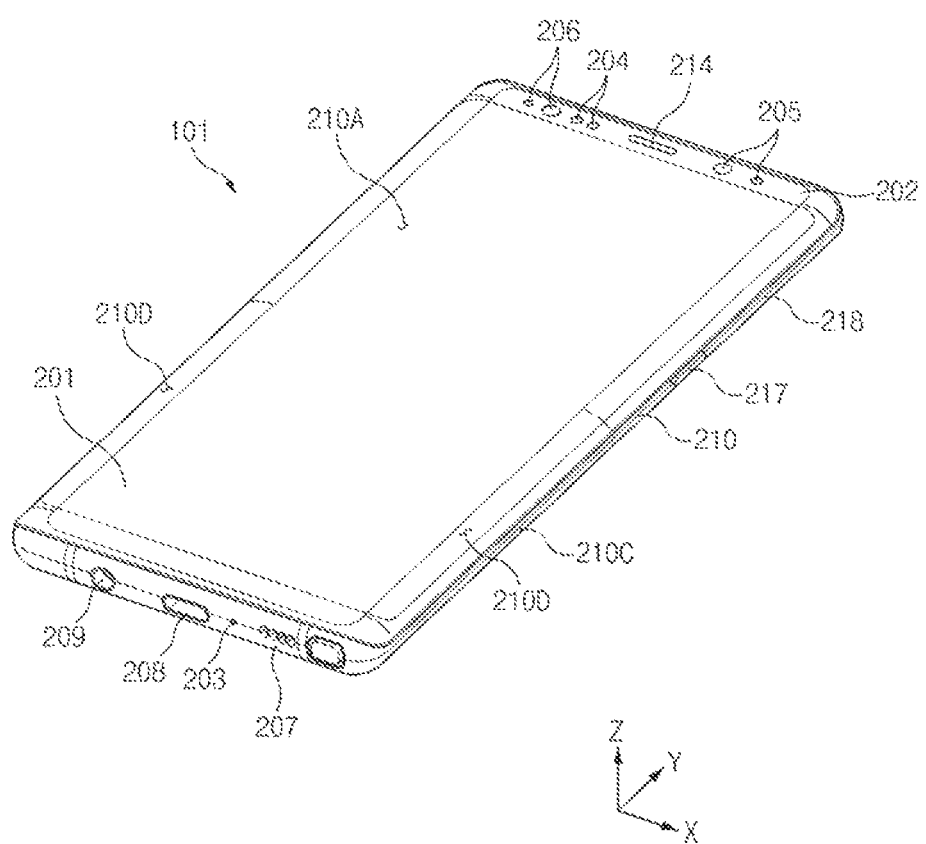
FIG. 2A is a perspective view of the front side of an electronic device according to an embodiment.
Figure 2B:
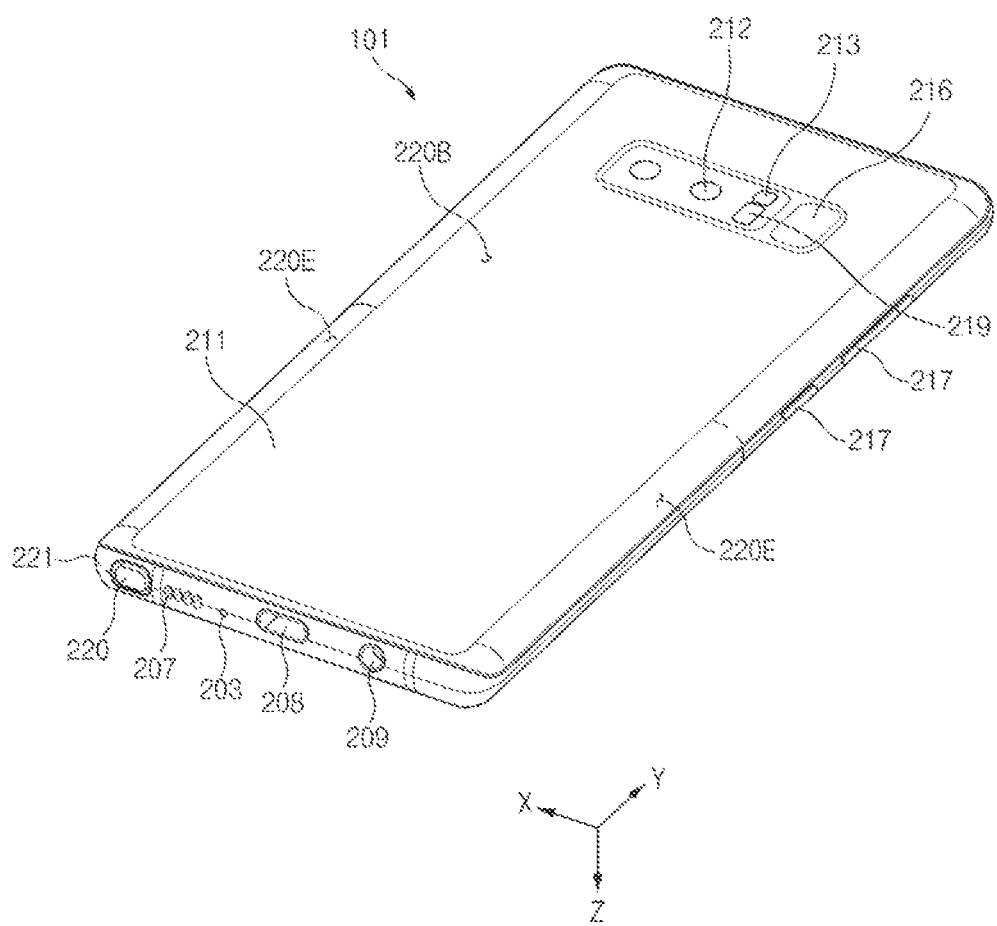
FIG. 2B is a perspective view of the rear side of an electronic device according to an embodiment.

FIG. 2A is a perspective view of the front side of the electronic device 101 according to an embodiment. FIG. 2B is a perspective view of the rear side of the electronic device 101 according to an embodiment.

In an embodiment, the electronic device 101 may include a housing 210. The housing 210 may include a first surface 210A, a second surface 210B, and a side surface 210C. The first surface 210A may be a front side. The second surface 210B may be a rear side. The side surface 210C may surround a space between the first surface 210A and the second surface 210B. In another embodiment, the housing 210 may refer to a structure forming some of the first surface 210A, the second surface 210B, and the side surface 210C.

In an embodiment, the first surface 210A may be formed of a front plate 202. At least a portion of the front plate 202 may be substantially transparent. For example, the front plate 202 may be formed of a glass plate or polymer plate including various coating layers.

In an embodiment, the second surface 210B may be formed of a rear plate 211. The rear plate 211 may be substantially opaque. For example, the rear plate 211 may be formed of a metal such as coated or tinted glass, ceramic, polymer, aluminum, stainless steel (STS), or magnesium. The rear plate 211 may be formed by a combination of at least two or more of the materials described above.

In an embodiment, the side surface 210C may be coupled to the front plate 202 and the rear plate 211. The side surface 210C may be formed in a side bezel structure 218. The side bezel structure 218 may be a side member. The side bezel structure 218 may include metal and/or polymer. In an embodiment, the rear plate 211 and the side bezel structure 218 may be integrally formed. In an embodiment, the rear plate 211 and the side bezel structure 218 may include the same material. For example, in an embodiment, the rear plate 211 and the side bezel structure 218 may equally include a metal material such as aluminum.

In an embodiment, the front plate 202 may include a first region 210D. The first region 210D may be bent from the first surface 210A toward the rear plate 211 and extend seamlessly. The first region 210D may be arranged at both ends of a long edge of the front plate 202. The rear plate 211 may include a second region 210E. The second region 210E may be bent from the second surface 210B toward the front plate 202 and extend seamlessly. The second region 210E may be arranged at both ends of the long edge of the rear plate 211. In an embodiment, the front plate 202 or the rear plate 211 may include only one of the first region 210D or the second region 210E. In another embodiment, some of the first region 210D or the second region 210E may not be included.

In an embodiment, when viewed in a side direction (X-axis direction) of the electronic device 101, the side bezel structure 218 may have a first thickness at a side that does not include the first region 210D or the second region 210E. When viewed in the side direction (X-axis direction) of the electronic device 101, the side bezel structure 218 may have a second thickness thinner than the first thickness on the side surface including the first region 210D and/or the second region 210E.

In an embodiment, the electronic device 101 may include at least one of a display 201 (e.g., the display module 160 of FIG. 1), audio modules 203, 207, and 214, and sensor modules 204, 216, and 219 (e.g., the sensor module 176 of FIG. 1), camera modules 205, 212, and 213 (e.g., the camera module 180 of FIG. 1), a key input device 217, a light emitting element 206, a stylus 220, and connector holes 208 and 209. In an embodiment, at least one of the components (e.g., the key input device 217 or the light emitting element 206) may be omitted from the electronic device 101, or the electronic device 101 may additionally include another component.

In an embodiment, the display 201 may be exposed through a substantial portion of the front plate 202. In an embodiment, at least a portion of the display 201 may be exposed through the front plate 202 including the first surface 210A and the first region 210D of the side surface 210C. A corner of the display 201 may be formed to be substantially identical to an adjacent outer shape of the front plate 202. In order to expand the area where the display 201 is exposed, the distance between the periphery of the display 201 and the periphery of the front plate 202 may be substantially the same.

In an embodiment, the audio modules 203, 207, and 214 may include the microphone hole 203 and the speaker holes 207 and 214. A microphone for obtaining external sound may be arranged inside the microphone hole 203. The speaker holes 207 and 214 may include the external speaker hole 207 and the receiver hole 214 for communication.

In an embodiment, the sensor modules 204, 216, and 219 may generate electrical signals or data values corresponding to an internal operating state of the electronic device 101 or an external environmental state. For example, the sensor modules 204, 216, and 219 may include the first sensor module 204 (e.g., a proximity sensor) arranged on the first surface 210A of the housing 210, the second sensor module 219 (e.g., an HRM sensor) arranged on the second surface 210B of the housing 210, and the third sensor module 216 (e.g., a fingerprint sensor). When the third sensor module 216 is a fingerprint sensor, the third sensor module 216 may be arranged on the first surface 210A or the second surface 210B of the housing 210. The electronic device 101 may further include a sensor among sensors included in the sensor module 176. For example, the electronic device 101 may further include at least one of a gesture sensor, a gyro sensor, an air pressure sensor, a magnetic sensor, an acceleration sensor, a grip sensor, a color sensor, an infrared (IR) sensor, a bio sensor, a temperature sensor, a humidity sensor, or an illumination sensor.

In an embodiment, the camera modules 205, 212, and 213 may include the first camera device 205 arranged on the first surface 210A of the electronic device 101 and the second camera device 212 arranged on the second surface 210B, and/or the flash 213. The first camera device 205 and the second camera device 212 may include one or more lenses, an image sensor, and/or an image signal processor. The flash 213 may include a light emitting diode or a xenon lamp. Two or more lenses (infrared camera, wide-angle and telephoto lenses) and image sensors may be arranged on one surface of the electronic device 101.

In an embodiment, the key input device 217 may be arranged on the side surface 210C of the housing 210. The electronic device 101 may not include some or all of the key input device 217. The key input device 217 that is not included may be implemented in another form such as soft keys on the display 201. The key input device 217 may include the sensor module 216 arranged on the second surface 210B of the housing 210.

In an embodiment, the light emitting element 206 may be arranged on the first surface 210A of the housing 210. The light emitting element 206 may provide state information of the electronic device 101 in the form of light. The light emitting element 206 may provide a light source interlocked with the operation of the camera module 205. The light emitting element 206 may include an LED, an IR LED, or a xenon lamp.

In an embodiment, the connector holes 208 and 209 may include the first connector hole 208 and the second connector hole 209. The first connector hole 208 may accommodate a connector for transmitting and receiving power and/or data to and from an external electronic device. For example, the first connector hole 208 may be a USB connector. The second connector hole 209 may accommodate a connector for transmitting and receiving an audio signal to and from an external electronic device. For example, the second connector hole 209 may be an earphone jack.

In an embodiment, the stylus 220 may be guided into the housing 210 through a hole 221 formed on a side surface of the housing 210 to be inserted or detached. The stylus 220 may include a button to facilitate detachment. A resonance circuit may be embedded in the stylus 220. The stylus 220 may operate in an electro-magnetic resonance (EMR) scheme, an active electrical stylus (AES) scheme, or an electric coupled resonance (ECR) scheme.

In an embodiment, the stylus 220 may be connected to the electronic device 101 through wireless communication. The stylus 220 may provide various inputs to the electronic device 101.

Figure 3:
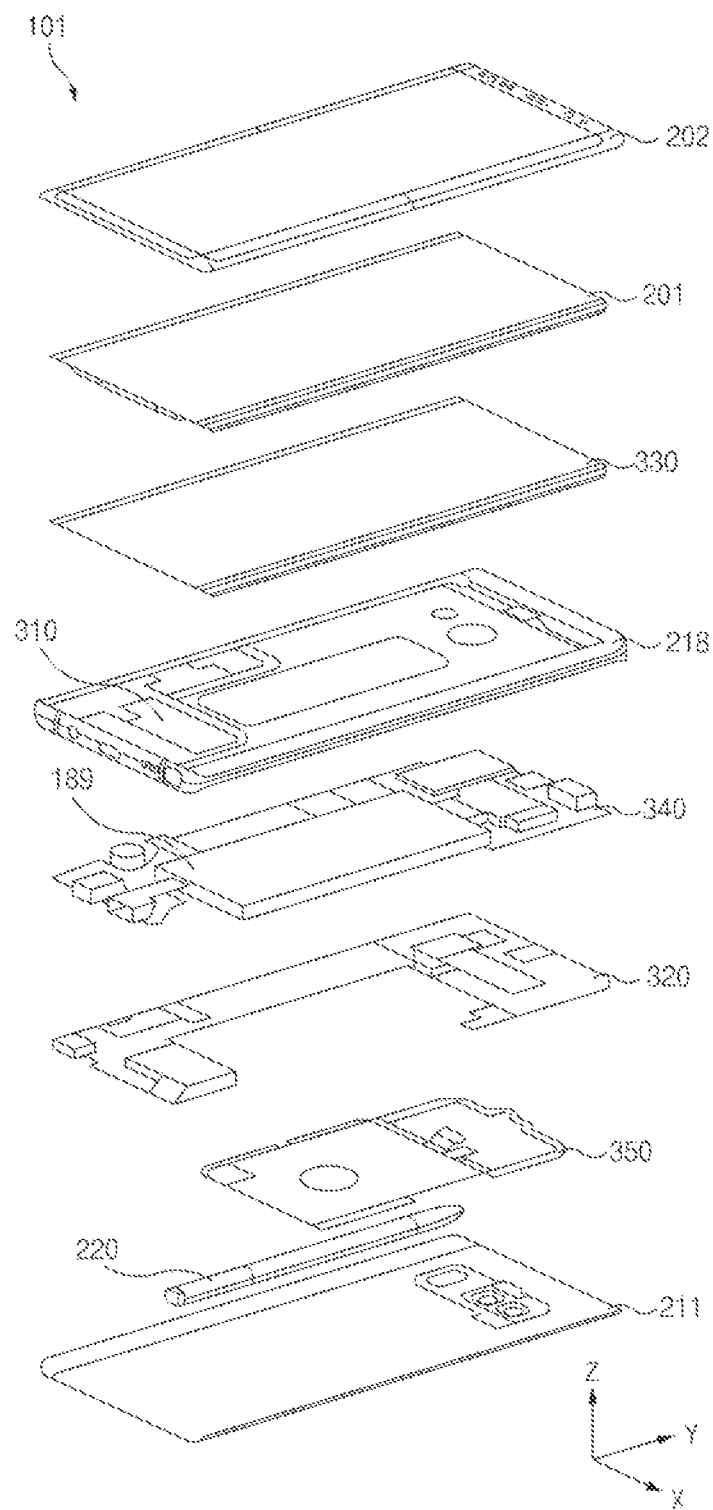
FIG. 3 is an exploded perspective view of an electronic device according to an embodiment.

FIG. 3 is an exploded perspective view of the electronic device 101 according to an embodiment.

In an embodiment, the electronic device 101 may include the battery 189, the display 201, the front plate 202, the rear plate 211, the side bezel structure 218, the stylus 220, a first support member 310, a second support member 320, an electromagnetic induction panel 330, a printed circuit board (PCB) 340, and an antenna 350. In an embodiment, the electronic device 101 may omit at least one (e.g., the first support member 310 or the second support member 320) of the components or may additionally include another component. Hereinafter, among the descriptions of the battery 189, the display 201, the front plate 202, the rear plate 211, the side bezel structure 218, and the stylus 220 of FIG. 3, descriptions overlapping with those of the battery 189, the display 201, the front plate 202, the rear plate 211, the side bezel structure 218, and the stylus 220 of the electronic device 101 of FIGS. 1, 2A and 2B will be omitted.

In an embodiment, the first support member 310 may be arranged inside the electronic device 101. The first support member 310 may be connected to the side bezel structure 218. The first support member 310 may be integrally formed with the side bezel structure 218. The first support member 310 may be a bracket. The first support member 310 may be formed of a metal material and/or a non-metal material. For example, the first support member 310 may be formed of a polymer. The display 201 may be coupled to one surface of the first support member 310 facing the +Z-axis direction. The PCB 340 may be coupled to an opposite surface of the first support member 310 facing the −Z axis direction.

In an embodiment, the second support member 320 may be arranged inside the electronic device 101. The second support member 320 may be a rear case. The second support member 320 may be formed of a metal material and/or a non-metal material. The PCB 340 may be coupled to one surface of the second support member 320 facing the +Z-axis direction. The rear plate 211 may be coupled to an opposite surface of the second support member 320 facing the −Z-axis direction.

In an embodiment, the electromagnetic induction panel 330 may detect an input of the stylus 220. The electromagnetic induction panel 330 may be interlocked with the resonance circuit of the stylus 220. The electromagnetic induction panel 330 may detect the magnetic type stylus 220. The electromagnetic induction panel 330 may be a digitizer. The electromagnetic induction panel 330 may be a panel that detects an input of the stylus 220. For example, the electromagnetic induction panel 330 may include a flexible printed circuit board (FPCB) and a shielding sheet. The shielding sheet may block electromagnetic fields generated from components (e.g., the display 201, the PCB 340, and the electromagnetic induction panel 330) included in the electronic device 101. The shielding sheet may prevent interference between components due to an electromagnetic field generated from within the electronic device 101. The shielding sheet may ensure an input from the stylus 220 to be accurately transferred to a coil included in the electromagnetic induction panel 330. The electromagnetic induction panel 330 may be arranged adjacent to the display 201. The electromagnetic induction panel 330 may be coupled with the display 201.

In an embodiment, the PCB 340 may be arranged inside the electronic device 300. The PCB 340 may be arranged on the same XY plane as at least a portion of the battery 189. A processor (e.g., the processor 120 of FIG. 1), a memory (e.g., the memory 130 of FIG. 1), and/or an interface (e.g., an interface 177 of FIG. 1) may be mounted on the PCB 340.

In an embodiment, the antenna 350 may be arranged between the rear plate 211 and the battery 189. The antenna 350 may include a near field communication (NFC) antenna, a wireless charging antenna, and/or a magnetic secure transmission (MST) antenna. The antenna 350 may perform short-range communication with an external device or wirelessly transmit and receive power required for charging. In an embodiment, an antenna structure may be formed by a portion or a combination of the side bezel structure 218 and/or the first support member 310.

Figure 4:
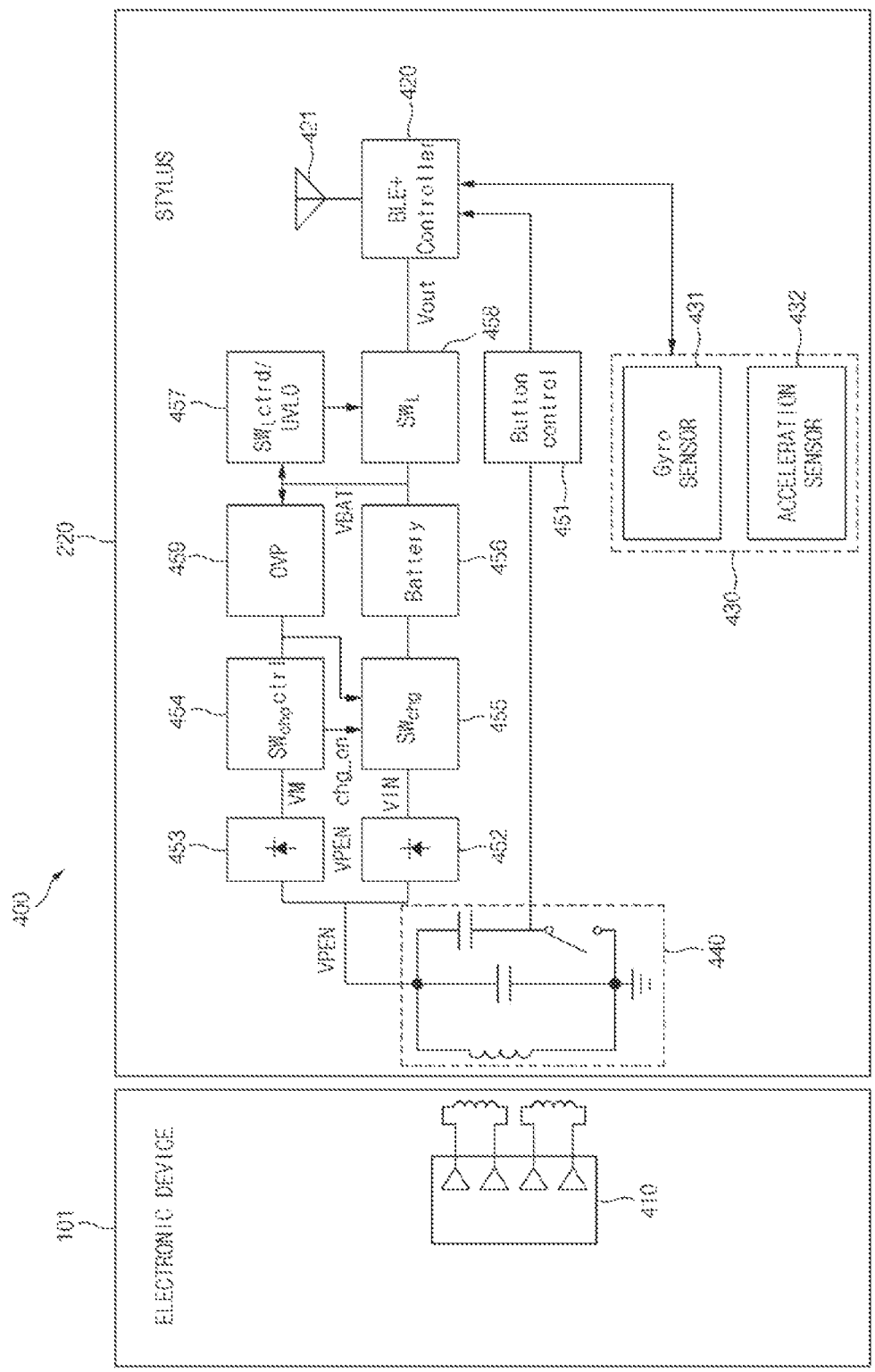
FIG. 4 is a block diagram illustrating a system including an electronic device and a stylus according to an embodiment.

FIG. 4 is a block diagram illustrating a system 400 including the electronic device 101 and the stylus 220 according to an embodiment. The electronic device 101 according to an embodiment may include a stylus controller 410. The stylus 220 according to an embodiment may include a Bluetooth low energy (BLE) controller 420, an antenna 421, a sensor unit 430, a resonance unit 440, a button controller 451, a first rectifier 452, a second rectifier 453, a charge switch controller (SWchg ctrl) 454, a charge switch (SWchg) 455, a battery 456, a load switch controller (SWL ctrl) 457, a load switch (SWL) 458, and an overvoltage protection circuit (OVP) 459. The sensor unit 430 may include a gyro sensor 431 and an acceleration sensor 432.

In an embodiment, the stylus controller 410 may be wirelessly connected to the stylus 220. The stylus controller 410 may receive an input from the stylus 220.

In an embodiment, the Bluetooth low power controller 420 may establish wireless communication with the electronic device 101. The Bluetooth low power controller 420 may establish Bluetooth low power communication with a master Bluetooth low power controller of the electronic device 101. The Bluetooth low power controller 420 may be a slave Bluetooth low power controller that wirelessly communicates with the master Bluetooth low power controller. The Bluetooth low power controller 420 may check whether the stylus 220 is inserted into the electronic device 101. The Bluetooth low power controller 420 may control whether the gyro sensor 431 and/or the acceleration sensor 432 are activated based on a button input of the stylus 220. Meanwhile, the activation time point is merely exemplary, and the activation time point for each sensor is not limited. The Bluetooth low power controller 420 may exchange sensing data obtained from the gyro sensor 431 and/or the acceleration sensor 432 with the electronic device 101 based on a button input of the stylus 220.

In an embodiment, the gyro sensor 431 may be activated according to a button input of the stylus 220. The gyro sensor 431 may sense rotation information based on the movement of the stylus 220.

In an embodiment, the acceleration sensor 432 may be activated when the stylus 220 is separated from the accommodating unit (e.g., the hole 221 of FIG. 2B) of the electronic device 101.

The acceleration sensor 432 may sense acceleration information based on the movement of the stylus 220.

In an embodiment, the sensor unit 430 may further include a geomagnetic field sensor.

In an embodiment, the Bluetooth low power controller 420 may identify information (e.g., coordinates and/or displacement of the stylus 220) on the position of the stylus 220 identified based on the received sensing data. The Bluetooth low power controller 420 may transmit the information on the identified position of the stylus 220 to the electronic device 101 through the antenna 421.

In an embodiment, the resonance unit 440 may detect an electromagnetic field signal applied from an outside. The resonance unit 440 may transmit and receive an electromagnetic signal to and from the stylus controller 410. The resonance unit 440 may transmit a signal for wireless communication with the stylus controller 410. For example, the resonance unit 440 may transmit a signal including data related to an input provided from the stylus 220 to the electronic device 101.

In an embodiment, the button controller 451 may transmit a button input of the stylus 220 to the Bluetooth low power controller 420. The button controller 451 may measure the distance between the stylus 220 and the display (e.g., the display 201 of FIG. 2A) of the electronic device 101. The button controller 451 may determine whether the distance between the stylus 220 and the display 201 is greater than or equal to a threshold value. The button controller 451 may transmit a button input of the stylus 220 to the Bluetooth low power controller 420 when the distance between the stylus 220 and the display 201 is greater than or equal to the threshold value. The Bluetooth low power controller 420 may transmit information about the received button input to the electronic device 101 through the antenna 421.

In an embodiment, the first rectifier 452 may rectify a signal to be transmitted from the stylus controller 410 to the Bluetooth low power controller 420 through the resonance unit 440.

In an embodiment, the second rectifier 453 may rectify a signal to be transmitted from the Bluetooth low power controller 420 to the stylus controller 410 through the resonance unit 440.

In an embodiment, the charge switch controller 454 may determine whether the signal received from the first rectifier 452 is a position detection signal applied by an electromagnetic induction panel (e.g., the electromagnetic induction panel 330 of FIG. 3) or a charging signal. The charge switch controller 454 may turn the charge switch 455 on or off. The charge switch controller 454 may control charging of the battery 456.

In an embodiment, the charge switch 455 may transmit the charge power received from the first rectifier 452 to the battery 456 under control of the charge switch controller 454.

In an embodiment, the battery 456 may receive the charging power applied to the first rectifier 452 when the charge switch 455 is turned on. The battery 456 may be connected to the Bluetooth low power controller 420. The battery 456 may supply power to the Bluetooth low power controller 420.

In an embodiment, the load switch controller 457 may measure a voltage value output from the battery 456. The load switch controller 457 may supply power to the Bluetooth low power controller 420 by controlling the load switch 458 when the measured voltage value is greater than or equal to a threshold value. The load switch controller 457 may include an under voltage lock out (UVLO) circuit.

In an embodiment, the load switch 458 may supply power necessary for the Bluetooth low power controller 420 to operate under the control of the load switch controller 457. The load switch 458 may control the connection between the Bluetooth low power controller 420 and the battery 456.

In an embodiment, the overvoltage protection circuit 459 may control the voltage supplied from the battery 456 to the Bluetooth low power controller 420 to be prevented from rising above a threshold value. The overvoltage protection circuit 459 may block a voltage higher than the threshold value.

Figure 5:
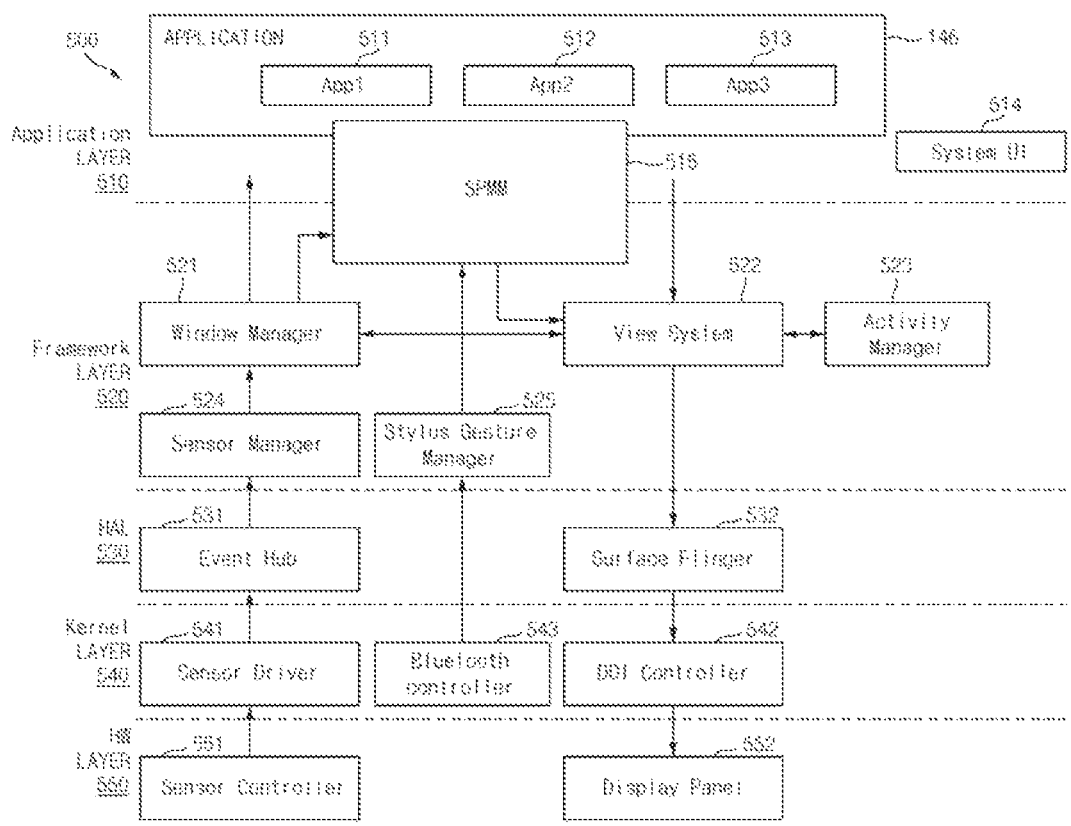
FIG. 5 is a block diagram illustrating a software system of an electronic device according to an embodiment.

FIG. 5 is a block diagram 500 illustrating a software system of an electronic device (e.g., the electronic device 101 of FIG. 1) according to an embodiment. The software system of the electronic device 101 according to an embodiment may include an application layer 510, a framework layer 520, a hardware abstraction layer (HAL) 530, a kernel layer 540, and a hardware (HW) layer 550. However, the embodiment is not limited to the above, and at least a part of the software system of the electronic device 101 may be changed according to a platform included in the electronic device 101.

In an embodiment, the application layer 510 may include a first app 511, a second app 512, and a third app 513 included in the application 146, and a system user interface (UI) 514. The application 146 may be an application stored in the memory of the electronic device 101 or executable or installed by a processor. The application 146 may draw at least one layer based on a resolution of a display (e.g., the display 201 of FIG. 2A). The application 146 may draw a layer by using a drawing library. For example, the system UI 514 may be an application that controls display of a fixed region/part of a screen or a common function. For example, the system UI 514 may manage a screen related to a notification bar or a quick view.

In an embodiment, a stylus pointer movement manager (SPMM) 515 may be arranged between the application layer 510 and the framework layer 520. The stylus pointer movement manager 515 may manage a coordinate system of a stylus (e.g., the stylus 220 of FIG. 2A). The stylus pointer movement manager 515 may identify the movement (or movement information) of a stylus pointer displayed on the screen of the display (e.g., the display 201 of FIG. 2A) of the electronic device 101 based on the movement of the stylus 220 obtained from a stylus gesture manager 525. The stylus pointer movement manager 515 may manage a coordinate system including coordinate information of the stylus pointer according to the movement of the stylus pointer.

In an embodiment, the framework layer 520 may include a window manager 521, a view system 522, an activity manager 523, a sensor manager 524, and the stylus gesture manager 525.

In an embodiment, the window manager 521 may transmit information on a display region corresponding to a changed state of the electronic device 101 to the application 146. The window manager 521 may identify a state change of the electronic device 101 through a sensor module (e.g., the sensor module 176 of FIG. 1). For example, when a state change of the electronic device 101 is identified, the window manager 521 may transmit the information on the display region corresponding to the changed state of the electronic device 101 to the application 146 in which continuity is set among the running applications 146.

In an embodiment, the view system 522 may be a program for drawing a layer based on the resolution of the display 201.

The application 146 may draw a layer based on the resolution of the display 201 by using the view system 522. The view system 522 may include a set of extensible views used to generate a user interface of the application 146.

In an embodiment, the activity manager 523 may control the screen displayed on the display 201 based on the usability of the application 146. The sensor manager 524 may control a sensor included in the sensor module 176 based on the usability of the application 146. The stylus gesture manager 525 may control an input according to the movement of the stylus 220 based on the usability of the application 146. The stylus gesture manager 525 may control a Bluetooth controller 543. The stylus gesture manager 525 may control the input according to the movement of the stylus 220 obtained by controlling the Bluetooth controller 543, based on the usability of the application 146.

In an embodiment, the hardware abstraction layer 530 may be an abstraction layer between a plurality of hardware modules included in the hardware layer 550 and software of the electronic device 101. The hardware abstraction layer 530 may be a library layer. The hardware abstraction layer 530 may include an event hub 531 and a surface flinger 532.

In an embodiment, the event hub 531 may obtain an event occurring in the touch module and the sensor module 176 of the display 201. The surface flinger 532 may synthesize a plurality of layers. The surface flinger 532 may provide data on the plurality of synthesized layers to a display driver integrated circuit (DDI) controller 542 that controls the display 201.

In an embodiment, the kernel layer 540 may include various drivers for controlling various hardware modules included in the electronic device 101. The kernel layer 540 may include a sensor driver 541, the DDI controller 542, and the Bluetooth controller 543.

In an embodiment, the sensor driver 541 may control a sensor controller 551 connected to the sensor included in the sensor module 176. The sensor driver 541 may be an interface module that controls the sensor controller 551. The DDI controller 542 may correspond to a display driver integrated circuit (DDI). The Bluetooth controller 543 may control the stylus controller 410.

In an embodiment, the hardware layer 550 may include a hardware module or component included in the electronic device 101, for example, the sensor controller 551 and a display panel 552, and at least some of the components shown in FIG. 1. In an embodiment, the hardware layer 550 may identify a state change of the electronic device 101 based on the sensor module 176. The sensor controller 551 may control the sensor module 176. The display panel 552 may sense a user's touch input by using a touch sensor.

Figure 6:
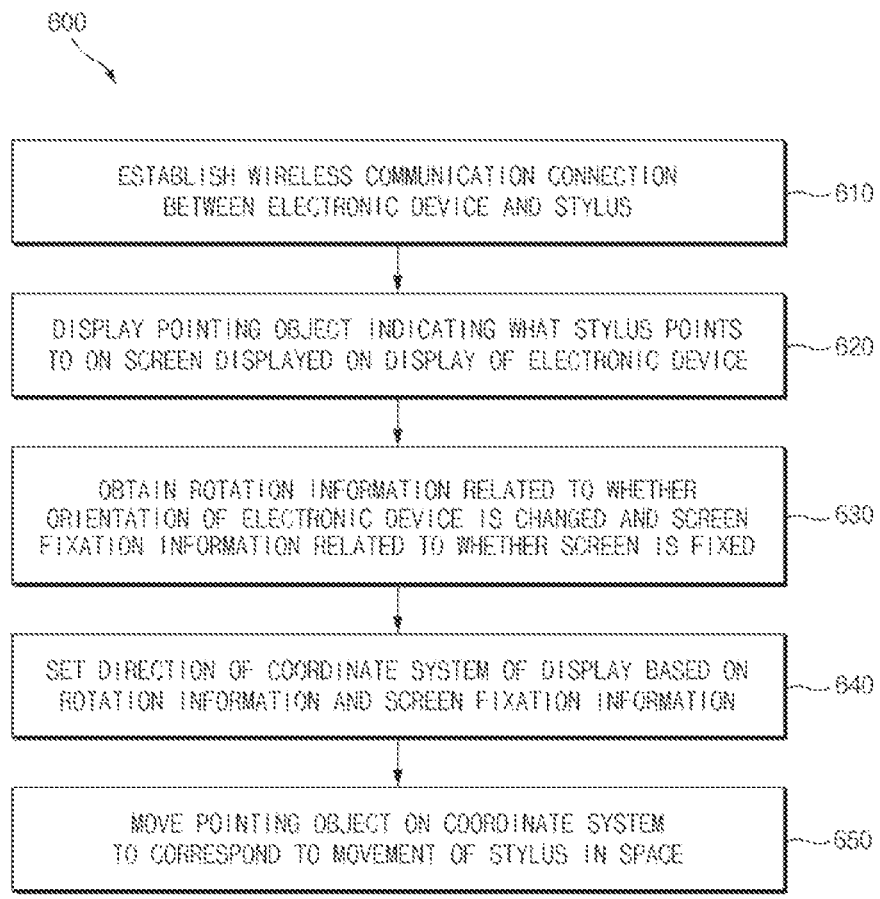
FIG. 6 is a flowchart illustrating a method of controlling an electronic device using a stylus according to an embodiment.

FIG. 6 is a flowchart 600 illustrating a method of controlling an electronic device (e.g., the electronic device 101 of FIG. 1) using a stylus (e.g., the stylus 220 of FIG. 2A) according to an embodiment.

In operation 610, the processor (e.g., the processor 120 of FIG. 1) of the electronic device 101 according to an embodiment may establish a wireless communication connection between the electronic device 101 and the stylus 220. The electronic device 101 and the stylus 220 may perform a connection operation. When the stylus 220 is inserted into the electronic device 101, a connection operation may be executed. The processor 120 may identify an air interaction initiation event of the stylus 220. The processor 120 may initiate an air pointer of the stylus 220.

In operation 620, the processor 120 of the electronic device 101 according to an embodiment may display a pointing object indicating what the stylus 220 (e.g., the tip of the stylus 220) points to on a screen displayed on the display (e.g., the display 201 of FIG. 2A) of the electronic device 101. A pointing object may be a pointer. When the pointer of the stylus 220 is turned on, the pointing object may be displayed on the display 201 of the electronic device 101. The pointing object may be displayed in various forms such as an icon, a pointer, or an arrow. For example, the pointing object may be an air pointer icon.

In operation 630, the processor 120 of the electronic device 101 according to an embodiment may obtain rotation information related to whether the orientation of the electronic device 101 is changed and screen fixation information related to whether the screen is fixed. The processor 120 may obtain the rotation information of the electronic device 101 from a gyro sensor and an acceleration sensor included in a sensor module (e.g., the sensor module 176 of FIG. 1). The processor 120 may obtain screen fixation information including whether the orientation of a screen displayed by an application (e.g., the application 146 of FIG. 5) is fixed to a specified orientation. For example, the processor 120 may identify whether a screen of the application 146 that supports only a portrait mode screen, such as a camera application, is displayed. As another example, the processor 120 may identify whether a screen of the application 146 that supports only a landscape mode screen, such as a specified game application, is displayed.

In operation 640, the processor 120 of the electronic device 101 according to an embodiment may set the direction of the coordinate system of the display 201 based on the rotation information and the screen fixation information. The coordinate system of the display 201 may be a plane on which the pointing object is displayed while being moved on the display 201 according to the location information of the stylus 220. The processor 120 may receive the location information of the stylus 220. The processor 120 may change the direction of the coordinate system when the rotation information changes. The processor 120 may further reflect the screen fixation information to change the direction of the coordinate system to correspond to the direction in which the electronic device 101 is placed.

In operation 650, the processor 120 of the electronic device 101 according to an embodiment may move the pointing object on the coordinate system to correspond to the movement of the stylus 220 in space. The processor 120 may arrange a coordinate system in the determined direction and display the pointing object while moving the pointing object on the display 201 according to the location information of the stylus 220.

Figure 7:
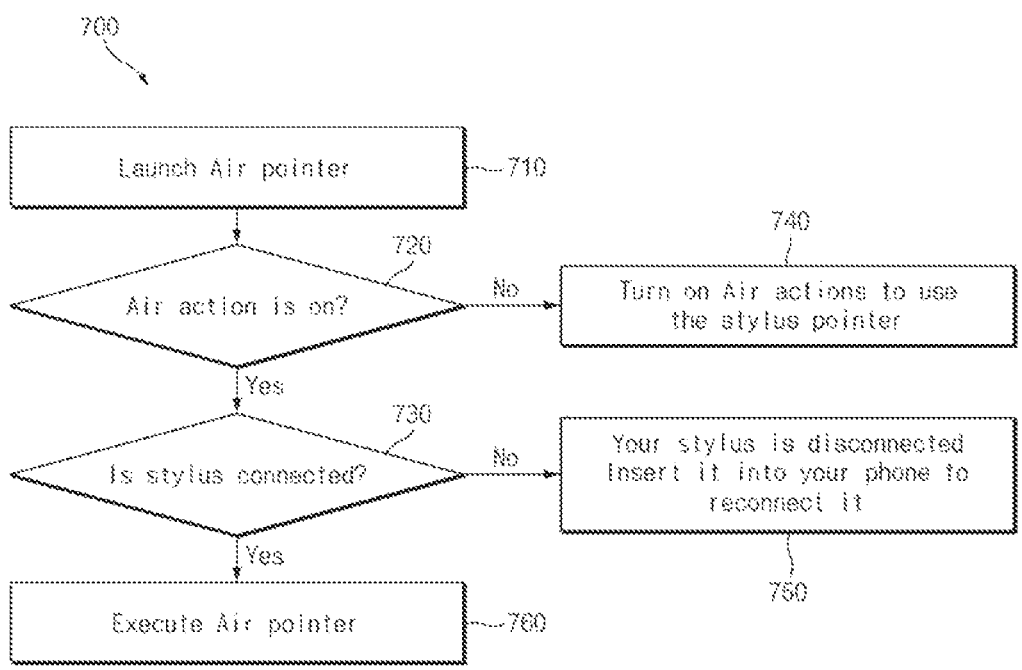
FIG. 7 is a flowchart illustrating an operation of connecting an electronic device according to an embodiment to a stylus and displaying a pointing object on a display.

FIG. 7 is a flowchart illustrating an operation of connecting an electronic device (e.g., the electronic device 101 of FIG. 1) according to an embodiment to a stylus (e.g., the stylus 220 of FIG. 2A) and displaying a pointing object on a display (e.g., the display 201 of FIG. 2A).

The processor (e.g., the processor 120 of FIG. 1) of the electronic device 101 according to an embodiment may launch an air pointer in operation 710.

In operation 720, the processor 120 of the electronic device 101 according to an embodiment may determine whether the air action function is turned on (air action is on?).

The processor 120 of the electronic device 101 performs at least one specified operation of the application 146 of the electronic device 101 corresponding to at least one specified movement of the stylus 220 by using the air action function. The processor 120 may determine whether an event in which an air interaction is initiated by the stylus (e.g., the stylus 220 of FIG. 2A) occurs. An event initiating an air interaction may be an event using an air pointer. For example, an event using an air pointer may be a case in which an air action mode is turned on. As another example, the event using an air pointer may be a case where the air point is turned on in the setting menu in a state in which the stylus 220 is wirelessly connected to the electronic device 101. When the air point is turned on in the setting menu, the air pointer may be executed independently.

When the air action is turned on (operation 720—Yes), the processor 120 may proceed to operation 730. The processor 120 may proceed to operation 740 when the air action is turned off (operation 720—No).

In operation 730, the processor 120 of the electronic device 101 according to an embodiment may determine whether the stylus 220 is connected (Is stylus connected?).

In operation 740, the processor 120 of the electronic device 101 according to an embodiment may turn on air actions to use the stylus 220 pointer (Turn on Air actions to use the stylus pointer). The processor 120 may execute an air pointer of the stylus 220.

The processor 120 of the electronic device 101 according to an embodiment may proceed to operation 760 when the stylus 220 is connected through wireless communication (operation 730—Yes). The processor 120 may proceed to operation 750 when the stylus 220 is not connected through wireless communication (operation 730—No).

In operation 750, the processor 120 of the electronic device 101 according to an embodiment may perform a guide of "Your stylus 220 is disconnected, insert it into your phone to reconnect it" through a user interface (e.g., a display (e.g., display 201 in FIG. 2A) or a speaker (e.g., the sound output module 155 in FIG. 1)).

In operation 760, the processor 120 of the electronic device 101 according to an embodiment may identify that the stylus 220 is connected to the electronic device 101 through wireless communication and execute an air pointer.

In an embodiment, the processor 120 of the electronic device 101 may terminate execution of the air pointer when receiving a specified motion (or gesture) and/or button input from the stylus 220.

Figure 8:
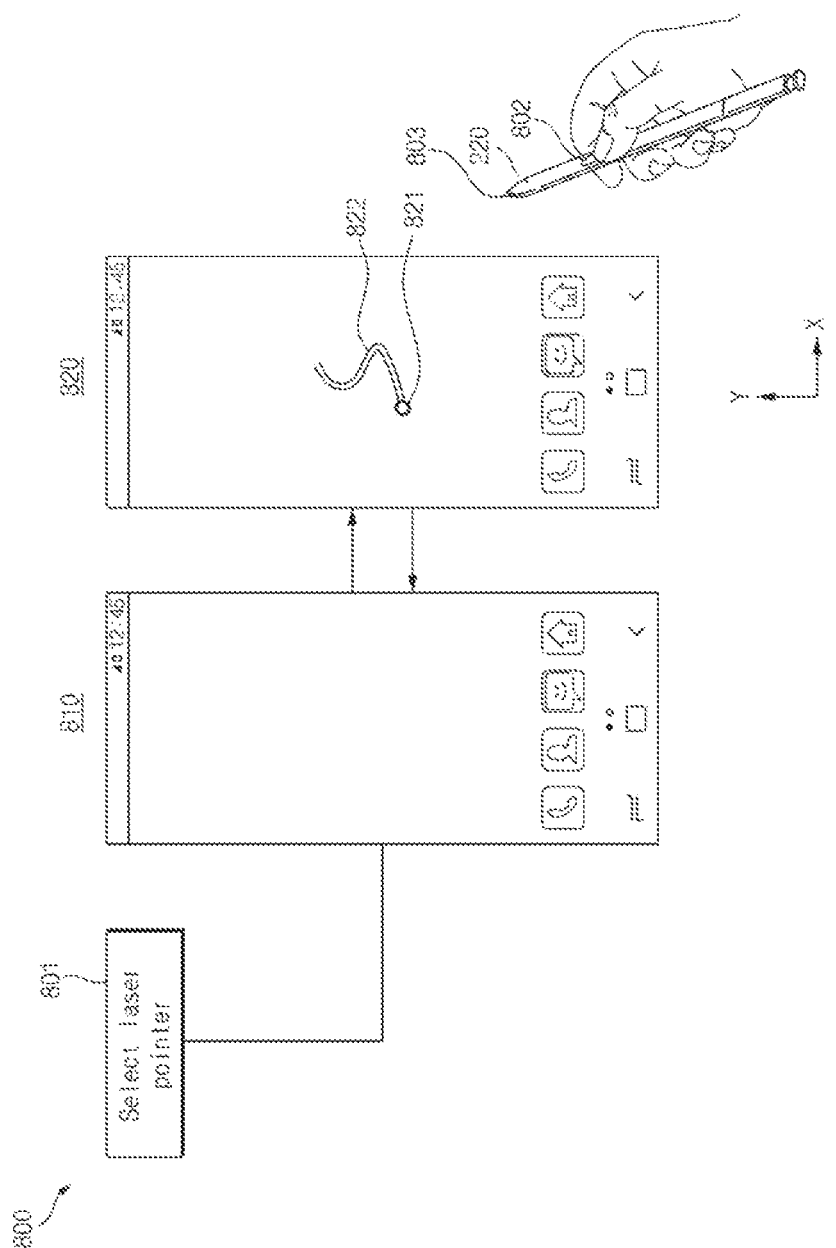
FIG. 8 is a diagram illustrating a pointing object indicating what the stylus points to on a screen displayed on a display of an electronic device according to an embodiment.

FIG. 8 is a diagram illustrating a pointing object 821 indicating what the stylus 220 points to on a screen 810 or 820 displayed on a display (e.g., the display 201 of FIG. 2A) of an electronic device (e.g., the electronic device 101 of FIG. 1) according to an embodiment.

In an embodiment, a processor (e.g., the processor 120 of FIG. 1) of the electronic device 101 may select a laser pointer 801.

In an embodiment, the stylus 220 may include a button 802. The stylus 220 may receive an input from the button 802 based on a user's input for the button 802. When the stylus 220 and the electronic device 101 are connected through wireless communication, the electronic device 101 may receive an input of the button 802 from the stylus 220. In a state in which the stylus 220 and the electronic device 101 are spaced apart from each other within a critical distance capable of being connected through wireless communication, the electronic device 101 may receive an input of the button 802 from the stylus 220.

In an embodiment, the electronic device 101 may display the first screen 810 on the display 201 before receiving an input of the button 802 from the stylus 220. The electronic device 101 may display the second screen 820 on the display 201 after receiving the input of the button 802.

In an embodiment, the electronic device 101 may display the pointing object 821 on the second screen 820 displayed on the display 201 after receiving the input of the button 802. The pointing object 821 may be a pointer. For example, the pointing object 821 may be displayed in the form of a dot on the second screen 820 in a similar form to pointing an object with a laser pointer. The pointing object 821 may have various forms such as an icon, an arrow, or a highlight display.

In an embodiment, the pointing object 821 may be displayed at a position indicated by a tip 803 of the stylus 220 on the display 201 of the electronic device 101.

In an embodiment, the pointing object 821 may move on the display 201 of the electronic device 101 to correspond to the movement of the stylus 220. The display 201 may display a movement trajectory 822 along which the pointing object 821 moves.

For example, when the stylus 220 moves while the button 802 is pressed based on a user's selection, the electronic device 101 may display the movement trajectory 822 along which the pointing object 821 moves, corresponding to the movement of the stylus 220.

Figure 9:
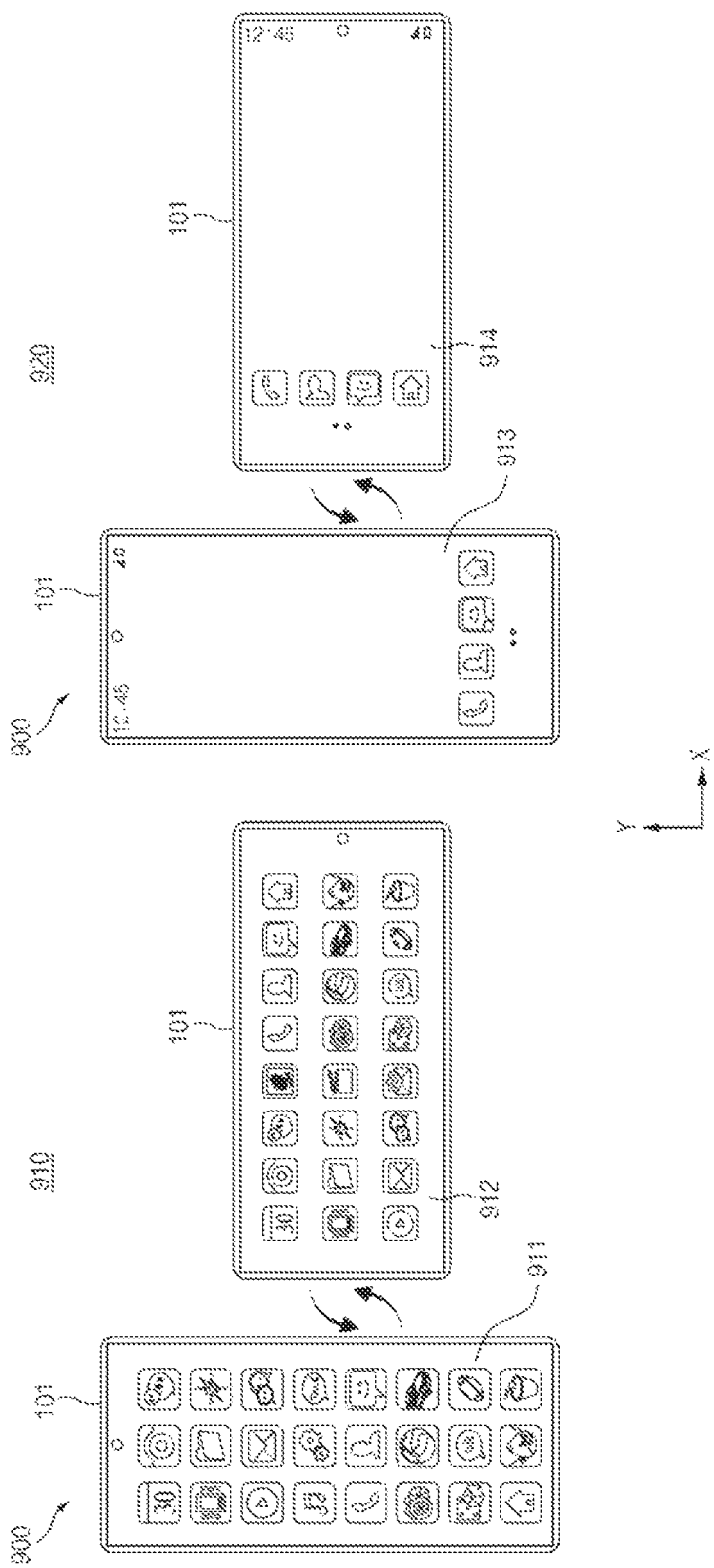
FIG. 9 is a diagram illustrating obtaining rotation information and screen fixation information of an electronic device according to an embodiment.

FIG. 9 is a diagram 900 illustrating obtaining rotation information and screen fixation information of the electronic device 101 according to an embodiment.

In an embodiment, a processor (e.g., the processor 120 of FIG. 1) of the electronic device 101 may receive the rotation information of the electronic device 101. The rotation information may be information related to whether the orientation of the electronic device 101 changes.

In an embodiment, the rotation information may include information about whether the direction in which the electronic device 101 faces changes. The processor 120 may obtain information about whether the direction in which the electronic device 101 faces changes by using a gyro sensor and an acceleration sensor included in a sensor module (e.g., the sensor module 176 of FIG. 1).

In an embodiment, the rotation information may include information about the direction in which the electronic device 101 faces. For example, the rotation information may include information about whether the electronic device 101 is in a portrait mode or a landscape mode. The portrait mode may be a mode in which a long side of the electronic device 101 faces in a Y-axis direction. The landscape mode may be a mode in which the long side of the electronic device 101 faces in an X-axis direction.

In an embodiment, the rotation information may include state information set in the setting menu of the electronic device 101. The state information may include an automatic rotation state and a vertical fixation state. The automatic rotation state may be a state in which the screen displayed on the display 201 is rotated to correspond to the direction in which the electronic device 101 faces when the electronic device 101 is rotated. The vertical fixed state may be a state in which the screen displayed on the display 201 is fixed in the vertical direction even when the electronic device 101 rotates.

In an embodiment, in a first situation 910 of displaying a home screen of the electronic device 101, the processor 120 may receive rotation information. The processor 120 may determine that the electronic device 101 is rotated 90 degrees. The screen displayed by the electronic device 101 may change from a portrait mode screen 911 to a landscape mode screen 912.

In an embodiment, in a second situation 920 in which the electronic device 101 executes an application, the processor 120 may receive the rotation information. The processor 120 may determine that the electronic device 101 is rotated 90 degrees. The screen displayed by the electronic device 101 is a portrait mode screen 913 before the electronic device 101 rotates, and a portrait mode screen 914 may be maintained even after the electronic device 101 rotates.

In an embodiment, the processor 120 may obtain screen fixation information. The screen fixation information may be information related to whether the screen is fixed. For example, when the screen is fixed, the screen displayed on the display 201 of the electronic device 101 may be in a vertical fixed state. As another example, when the screen is fixed, the screen displayed on the display 201 of the electronic device 101 may be in a horizontal fixed state.

In an embodiment, the case in which the screen is fixed may be a case in which the orientation of the screen is fixed by disabling the automatic rotation function of the screen in the setting menu. For example, when the screen is fixed, the state information set in the setting menu of the electronic device 101 may be a vertical fixed state. As another example, when the screen is fixed, the state information set in the setting menu of the electronic device 101 may be a horizontal fixed state.

In an embodiment, when the screen is fixed, it may be a case where an execution screen of an application (e.g., the application 146 of FIG. 1) in which the screen is fixed in a specified direction is displayed on the display 201. For example, a specific application such as a camera application may support only a portrait mode screen. As another example, in the case of a specified game application, only a screen in a landscape mode may be supported.

In an embodiment, the processor 120 may change the orientation of the electronic device 101 in the rotation information and change the direction of the coordinate system when the screen is fixed in the screen fixation information. When the direction of the screen displayed by the electronic device 101 is fixed to a specified direction, the direction of the coordinate system may be maintained. When the direction of the screen displayed on the display 201 is fixed to a specified direction even though the orientation of the electronic device 101 changes due to rotation of the electronic device 101, the processor 120 may change the direction of the coordinate system in which the pointing object (e.g., the pointing object 821 of FIG. 8) of the stylus (e.g., the stylus 220 of FIG. 2A) moves. The processor 120 may adjust the direction of the coordinate system such that the pointing object 821 moves corresponding to the movement of the stylus 220 in space. For example, when the electronic device 101 is rotated by 90 degrees and the orientation of the electronic device 101 changes from a vertical direction to a horizontal direction, regardless of whether the orientation of the screen displayed on the display 201 is fixed, the coordinate system may be rotated by 90 degrees. The processor 120 may move the pointing object 821 according to the movement of the stylus 220.

Figure 10:
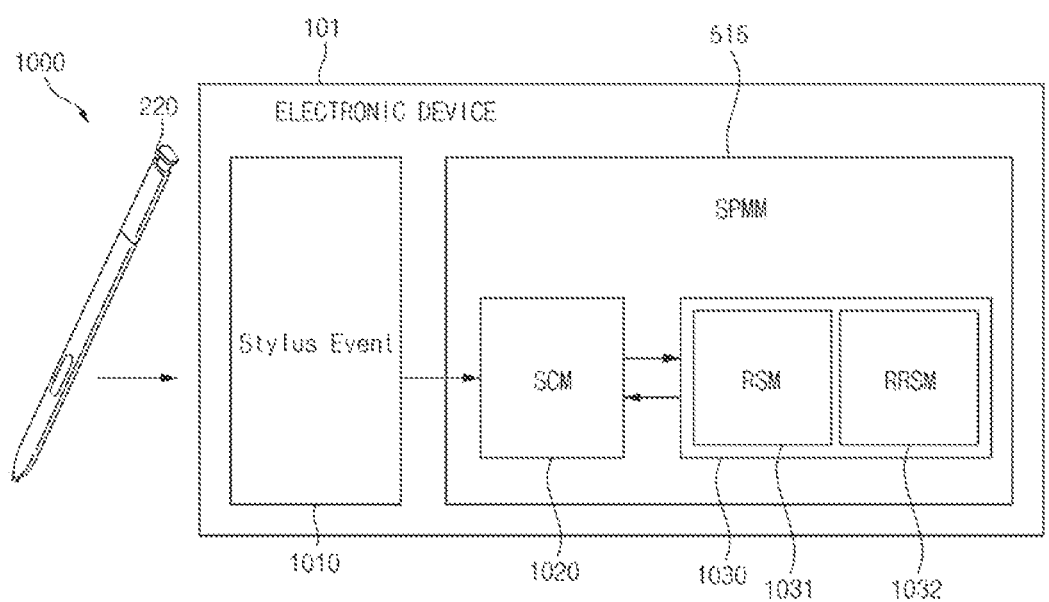
FIG. 10 is a diagram illustrating moving a pointing object by mapping the movement of a stylus according to an embodiment in a stylus pointer movement manager.

FIG. 10 is a diagram 1000 illustrating moving a pointing object (e.g., the pointing object 821 of FIG. 8) by mapping the movement of the stylus 220 according to an embodiment in a stylus pointer movement manager (e.g., the stylus pointer movement manager 515 of FIG. 5).

In an embodiment, the processor (e.g., the processor 120 of FIG. 1) of the electronic device 101 may receive coordinate information of the stylus 220. The processor 120 may receive a stylus event 1010 related to a change in coordinates according to movement of the stylus 220.

In an embodiment, the processor 120 may receive an inclination value of the stylus 220. The inclination value of the stylus 220 may vary depending on a scheme of gripping the stylus 220. The stylus 220 may obtain the inclination value through a gyro sensor (e.g., the gyro sensor 431 of FIG. 4) and an acceleration sensor (e.g., the sensor unit 430 of FIG. 4) included in a sensor unit (e.g., the sensor unit 430 of FIG. 4) of the stylus 220. The processor 120 may receive the inclination value. The processor 120 may transmit the received coordinate information and inclination information to the stylus pointer movement manager 515.

In an embodiment, the processor 120 may use the stylus pointer movement manager 515 to map the pointing object 821 to correspond to coordinate information and inclination information. The stylus pointer movement manager 515 may map the pointing object 821 to correspond to the position and moving direction of the stylus 220.

In an embodiment, the stylus pointer movement manager 515 may include a stylus coordinate module (SCM) 1020 and a rotation refresh rate module 1030. The rotation refresh rate module 1030 may include a rotation state module (RSM) 1031 and a refresh rate state module (RRSM) 1032. The SCM 1020 may receive rotation information from the RSM 1031. The SCM 1020 may receive refresh rate information of a screen displayed on a display (e.g., the display 201 of FIG. 2A) from the RRSM 1032. The SCM 1020 may map the rotation information and refresh rate information with the coordinate information of the stylus 220.

Figure 11:
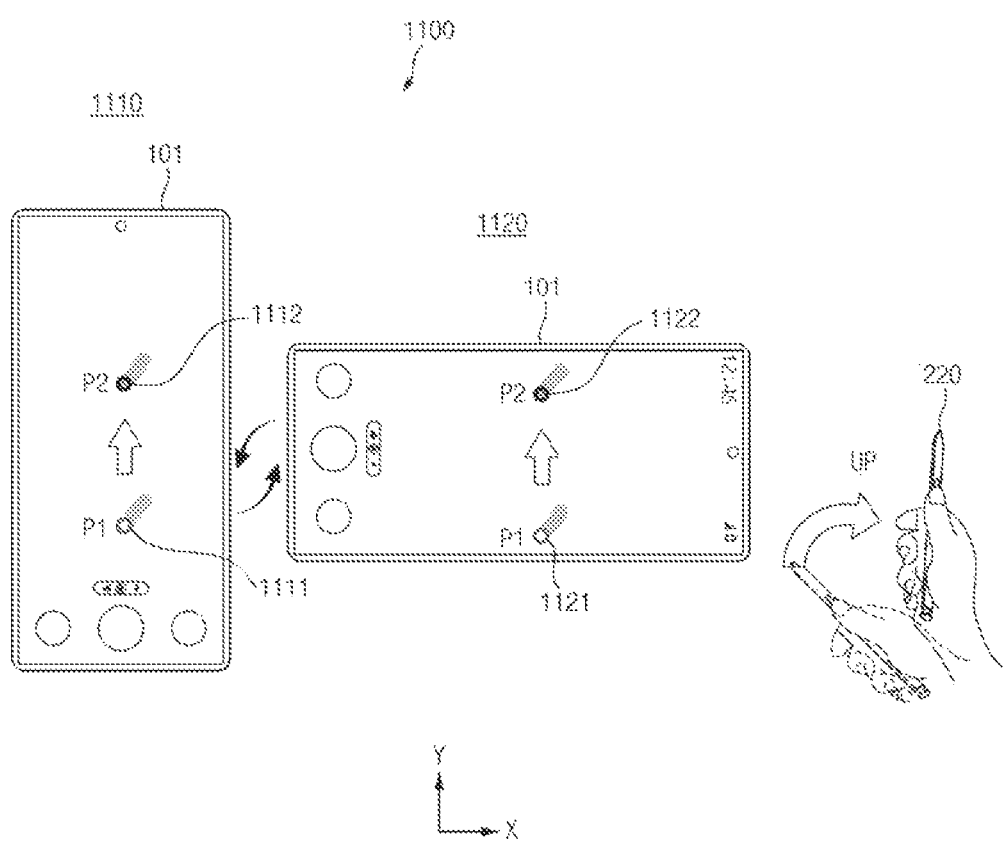
FIG. 11 is a diagram illustrating moving a pointing object to correspond to the movement of a stylus in space according to an embodiment.

FIG. 11 is a diagram 1100 illustrating moving pointing objects 1111, 1112, 1121, and 1122 to correspond to the movement of the stylus 220 in space according to an embodiment.

In an embodiment, the processor (e.g., the processor 120 of FIG. 1) of the electronic device 101 may allow the pointing objects 1111, 1112, 1121, and 1122 indicated by the stylus 220 to be displayed on a display (e.g., the display 201 of FIG. 2A) corresponding to the mapped coordinate information.

In an embodiment, the processor 120 may move the pointing objects 1112 and 1122 based on the direction of the coordinate system included in the mapped coordinate information. When the electronic device 101 is in a portrait mode 1110, the processor 120 may display the second pointing object 1112 that is a result of moving the first pointing object 1111 from a first location P1 to a second location P2. When the electronic device 101 is in a landscape mode 1120, the processor 120 may display the second pointing object 1122 that is a result of moving the first pointing object 1121 from the first location P1 to the second location P2.

In an embodiment, the processor 120 may determine the direction of the coordinate system by considering both the direction of the electronic device 101 and whether the screen displayed by the electronic device 101 is fixed. The processor 120 may change the direction of the coordinate system representing the pointing objects 1111, 1112, 1121, and 1122 when the direction of the electronic device 101 changes when the direction of the screen displayed by the electronic device 101 is fixed.

In an embodiment, when the electronic device 101 is in the portrait mode 1110 and the landscape mode 1120, the processor 120 may move the first pointing objects 1111 and 1121 located at the first location P1 upward in respon to an operation of pointing the stylus 220 upward in both modes. The processor 120 may display the second pointing objects 1121 and 1122 by moving the first pointing objects 1111 and 1121 to the second location P2. Accordingly, a user may move the pointing objects 1111, 1112, 1121, and 1122 with intuitive gestures when the electronic device 101 is in the portrait mode 1110 and in the landscape mode 1120.

FIG. 12 is a diagram illustrating an air action function by which an electronic device (e.g., the electronic device 101 of FIG. 1) performs a specified operation according to manipulation of a stylus (e.g., the stylus 220 of FIG. 2A) according to an embodiment.

In an embodiment, the button press action of the stylus 220 according to a first function set 1210 may include a single press and double presses. In response to the single press action, a camera may perform a capture function. In response to the single press action, the media may perform a play/pause function. In response to the double press action, the camera may perform a change front/rear camera function. In response to the double press action, the media may perform a function of moving to the next content.

In an embodiment, according to the first function set 1210, the gesture action of the stylus 220 may include left/right movement, up/down movement, and rotation. In response to left/right movement, the camera may perform a camera mode change function. In response to left/right movement, the media may play previous/next media. In response to up/down movement, a front/rear camera switch function may be performed. In response to the up/down movement, the media may increase/decrease the volume. In response to the rotation movement, the camera may perform zoom in/out or angle transition.

In an embodiment, various functions related to the front camera or the rear camera are performed in response to rotating the stylus 220 clockwise or counterclockwise according to the second function set 1220.

In an embodiment, while various applications (e.g., the application 146 of FIG. 1) such as Spotify®, YouTube®, and/or Netflix® according to a third function set 1230 are executed, various functions related to the executing state of the application 146 may be performed in response to moving the stylus 220 up/down, left/right, or rotating clockwise/counterclockwise.

Figure 13:
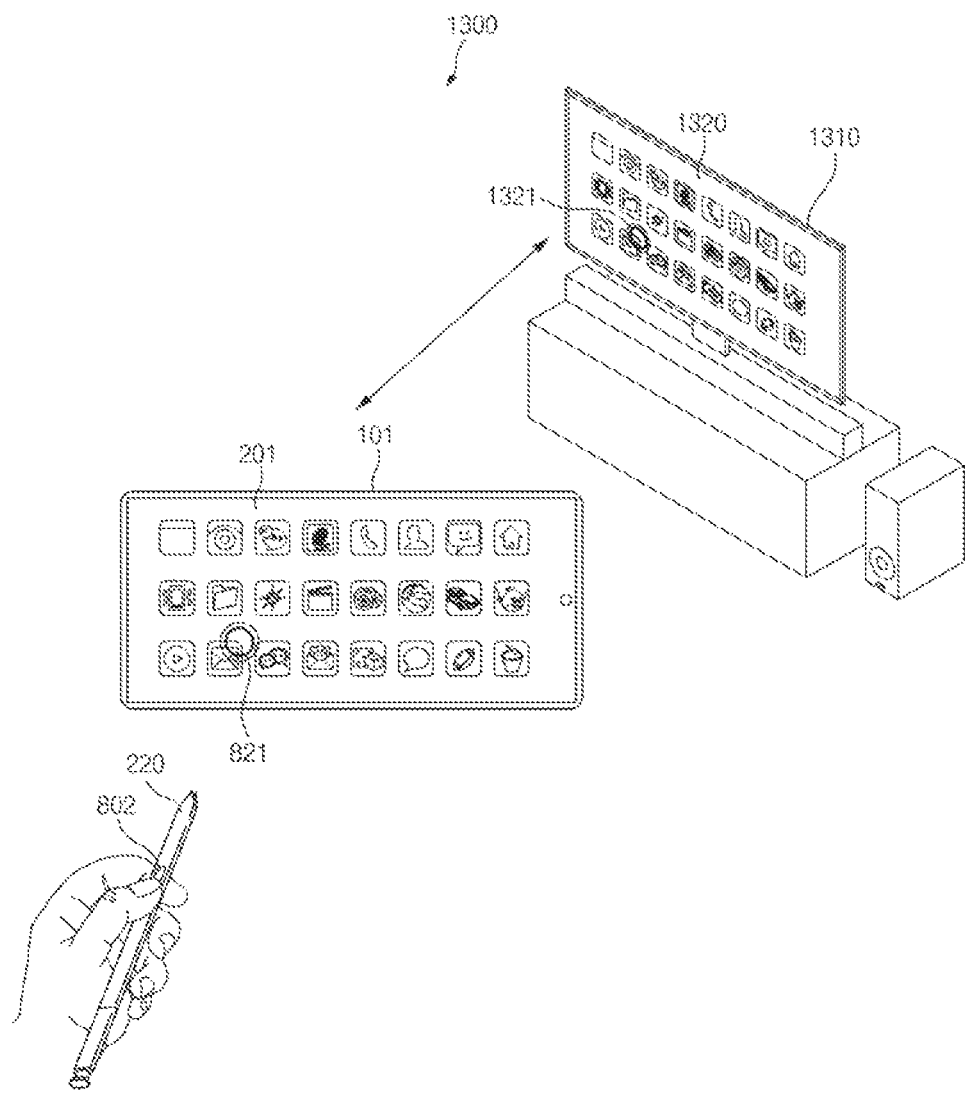
FIG. 13 is a diagram illustrating that an external electronic device displays an external pointing object when an electronic device according to an embodiment is connected to the external electronic device.

FIG. 13 is a diagram 1300 illustrating that an external electronic device 1310 displays an external pointing object 1321 when the electronic device 101 according to an embodiment is connected to the external electronic device 1310.

In an embodiment, the button 802 of the stylus 220 may be pressed in a state in which the electronic device 101 and the stylus 220 are connected through wireless communication. When the button 802 of the stylus 220 is pressed, the pointing object 821 may be displayed on the display 201 of the electronic device 101.

In an embodiment, the electronic device 101 may be connected to the external electronic device 1310. The external electronic device 1310 may be an external device having a display 1320 larger than the electronic device 101 such as a smart TV, a desktop computer, a notebook, or a tablet. The processor 120 may connect the electronic device 101 to the external electronic device 1310. For example, the processor 120 may connect the electronic device 101 to the external electronic device 1310 through wireless communication by using a wireless communication circuit (e.g., the wireless communication module 192 of FIG. 1). Wireless communication may be Wi-Fi communication or Bluetooth communication. As another example, the processor 120 may connect the electronic device 101 to the external electronic device 1310 by wire by using an interface (e.g., the interface 177 of FIG. 1) and a connection terminal (e.g., the connecting terminal 178 of FIG. 1). The wire may be a high definition multimedia interface (HDMI) cable.

In an embodiment, when the electronic device 101 and the external electronic device 1310 are connected to each other, a screen displayed on the display 201 of the electronic device 101 may be displayed on the display 1320 of the external electronic device 1310. To move the screen displayed on the display 201 of the electronic device 101 to the display 1320 of the external electronic device 1310, the electronic device 101 and the external electronic device 1310 may be connected through smart mirroring. When the pointing object 821 is displayed on the display 201 of the electronic device 101, the external pointing object 1321 corresponding to the pointing object 821 may be displayed on the display 1320 of the external electronic device 1310.

In an embodiment, the processor 120 may obtain external display information from the external electronic device 1310. The external display information may include a resolution, a refresh rate, a size, and a vertical-to-horizontal ratio of the display 1320 of the external electronic device 1310. The resolution of the external electronic device 1310 may be HD, FHD, WQHD, 8K, 4K, UHD, 2K, WUXGA, and WXGA. The refresh rate of the external electronic device 1310 may be a reproduction rate of the external electronic device 1310. The refresh rate of the external electronic device 1310 may be 60 Hz, 120 Hz, 144 Hz, or 240 Hz. The size and the vertical-to-horizontal ratio of the external electronic device 1310 may be included in model information of the external electronic device 1310. When the electronic device 101 and the external electronic device 1310 are connected to each other in a specified connection scheme, the electronic device 101 may receive the model information of the external electronic device 1310 from the external electronic device 1310. The specified connection scheme may be Wi-Fi communication, Bluetooth communication, HDMI cable, or smart mirroring.

In an embodiment, the processor 120 may convert the screen of the display 201 of the electronic device 101 to correspond to the external display information and display it on the display 1320 of the external electronic device 1310. When the resolution, refresh rate, size, and/or vertical-to-horizontal ratio of the display 201 of the electronic device 101 are different from those of the display 1320 of the external electronic device 1310, distortion may occur when the screen displayed on the display 201 of the electronic device 101 is displayed on the display 1320 of the external electronic device 1310 as it is. The processor 120 may reflect the external display information to change the resolution, refresh rate, size, and/or vertical-to-horizontal ratio of the displayed screen. The processor 120 may reflect the external display information on the display 1320 of the external electronic device 1310 to display a screen having the resolution, refresh rate, size, and/or vertical-to-horizontal ratio changed.

In an embodiment, the processor 120 may adjust the moving speed and moving distance of the external pointing object 1321 displayed on the screen displayed by the external electronic device 1310 based on the external display information. The processor 120 may transmit external display information to a stylus pointer movement manager (e.g., the stylus pointer movement manager 515 of FIG. 5). The stylus pointer movement manager 515 may reflect external display information to determine coordinates at which the external pointing object 1321 is displayed on the screen having the resolution, refresh rate, size, and/or vertical-to-horizontal ratio changed.

In an embodiment, the processor 120 may increase the moving speed and moving distance of the external pointing object 1321 as the size of the display 1320 of the external electronic device 1310 increases. For example, when the external electronic device 1310 is a TV, the processor 120 may increase the moving speed and moving distance of the external pointing object 1321 when the display 1320 of the external electronic device 1310 is 65 inches than when the display 1320 is 55 inches.

In an embodiment, the processor 120 may change the moving speed and moving distance of the external pointing object 1321 based on the type of application being executed in the electronic device 101. For example, when a game application requiring fast movement of the external pointing object 1321 is executed on the electronic device 101, the moving speed and moving distance of the external pointing object 1321 may be increased compared to when a document writing application is executed.

In an embodiment, the concept of adjusting the moving speed and moving distance of the external pointing object 1321 displayed on the screen displayed by the external electronic device 1310 may be applied even when the execution screen of a plurality of applications is displayed in the electronic device 101. When the electronic device 101 has a foldable form factor, the execution screen of a plurality of applications may be displayed in a multi-window form on the electronic device 101. When displaying the pointing object 821 while displaying the execution screen of a plurality of applications in a multi-window form on the display 201 of the electronic device 101, the processor 120 may set the moving direction, moving speed and/or moving distance of the pointing object 821 onto the screen of each window. For example, the processor 120 may set the moving direction of the pointing object 821 to be the same or different from each other in the main window and the sub-window. As another example, the moving speed and/or the moving distance of the pointing object 821 may be set differently in the main window and the sub-window.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of controlling an electronic device using a stylus, the method comprising:
    establishing a wireless radio-frequency communication connection between the electronic device and the stylus;
    setting a coordinate system of a display of the electronic device for recognizing movements of the stylus to a first direction;
    displaying a pointing object on a screen displayed on the display in a state where the stylus is separated from the display by a specified distance, wherein a position of the pointing object on the screen corresponds to a position of the stylus;
    executing an application;
    determining whether the application is set to run in one of a portrait mode or a landscape mode;
    when the application is fixed to run in the landscape mode and the electronic device is positioned in a direction corresponding to the portrait mode, or when the application is fixed to run in the portrait mode and the electronic device is positioned in a direction corresponding the landscape mode, setting the coordinate system of the display to a second direction perpendicular to the first direction; and
    moving the pointing object on the screen within the coordinate system to correspond to a movement of the stylus in space.

2. The method of claim 1, wherein the stylus is not in contact with the display during the movement of the stylus in space, and
    wherein the moving the pointing object further comprises:
        receiving coordinate information and an inclination value of the stylus; and
        mapping the pointing object onto a location on the screen while the stylus is not touching the display, wherein the location on the screen corresponds to the coordinate information and the inclination value.

3. The method of claim 1, further comprising:
    connecting the electronic device to an external electronic device;
    obtaining, by the electronic device, external display information from the external electronic device; and
    adjusting a moving speed and a moving distance of an external pointing object displayed on a screen displayed by the external electronic device based on the external display information.

4. The method of claim 3, wherein the external display information comprises a resolution, a refresh rate, a size, and a vertical-to-horizontal ratio of a display of the external electronic device.

5. The method of claim 4, wherein the size of the display of the external electronic device and the vertical-to-horizontal ratio of the display of the external electronic device are included in model information of the external electronic device, and
    wherein, when the electronic device and the external electronic device are connected to each other in a specified connection scheme, the electronic device receives the model information of the external electronic device from the external electronic device.

6. An electronic device comprising:
    a communication circuit;
    a display configured to display a screen;
    a stylus;
    at least one memory storing one or more instructions; and
    at least one processor operatively connected to the communication circuit, the display and the stylus, wherein the at least one processor is configured to execute the one or more instructions, and
    wherein the one or more instructions, when executed by the at least one processor, cause the electronic device to:
        establish a wireless radio-frequency communication connection between the electronic device and the stylus through the communication circuit,
        set a coordinate system of the display for recognizing movements of the stylus to a first direction,
        display a pointing object on the screen in a state where the stylus is separated from the display by a specified distance, wherein a position of the pointing object on the screen corresponds to a position of the stylus,
        execute an application,
        determine whether the application is set to run in one of a portrait mode or a landscape mode,
        when the application is fixed to run in the landscape mode and the electronic device is positioned in a direction corresponding to the portrait mode, or when the application is fixed to run in the portrait mode and the electronic device is positioned in a direction corresponding the landscape mode, set the coordinate system of the display to a second direction perpendicular to the first direction, and
        move the pointing object on the screen within the coordinate system to correspond to a movement of the stylus in space.

7. The electronic device of claim 6,
    wherein the stylus is not in contact with the display during the movement of the stylus in space, and
    wherein the one or more instructions, when executed by the at least one processor, cause the electronic device to:
        obtain coordinate information and an inclination value of the stylus, and map the pointing object onto a location on the screen while the stylus is not touching the display, wherein the location on the screen corresponds to the coordinate information and the inclination value.

* * * * *